United States Patent
Roh et al.

(10) Patent No.: US 11,301,625 B2
(45) Date of Patent: Apr. 12, 2022

(54) SIMULTANEOUS INTERPRETATION SYSTEM AND METHOD USING TRANSLATION UNIT BILINGUAL CORPUS

(71) Applicant: ELECTRONICS AND TELECOMMUNICATIONS RESEARCH INSTITUTE, Daejeon (KR)

(72) Inventors: Yoon Hyung Roh, Daejeon (KR); Jong Hun Shin, Daejeon (KR); Young Ae Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 108 days.

(21) Appl. No.: 16/681,866

(22) Filed: Nov. 13, 2019

(65) Prior Publication Data
US 2020/0159822 A1 May 21, 2020

(30) Foreign Application Priority Data
Nov. 21, 2018 (KR) .................. 10-2018-0144592

(51) Int. Cl.
*G06F 40/45* (2020.01)
*G06F 40/211* (2020.01)
(Continued)

(52) U.S. Cl.
CPC .......... *G06F 40/211* (2020.01); *G06F 40/253* (2020.01); *G10L 13/00* (2013.01); *G10L 15/22* (2013.01); *G10L 15/26* (2013.01)

(58) Field of Classification Search
CPC ........... G06F 40/44; G06F 40/45; G06F 40/58
See application file for complete search history.

(56) References Cited

U.S. PATENT DOCUMENTS 7,113,903 B1* 9/2006 Riccardi ................ G06F 40/44
704/4
8,374,881 B2* 2/2013 Bangalore ............... G06F 40/58
704/277
(Continued)

FOREIGN PATENT DOCUMENTS

KR 10-0398344 B1 9/2003
KR 10-2016-0131730 A 11/2016
KR 10-2018-0047789 A 5/2018

OTHER PUBLICATIONS

Sun, Le, et al. "Word Alignment of English-Chinese Bilingual Corpus Based on Chucks." 2000 Joint SIGDAT Conference on Empirical Methods in Natural Language Processing and Very Large Corpora. 2000. (Year: 2000).*

*Primary Examiner* — Jialong He
(74) *Attorney, Agent, or Firm* — LRK Patent Law Firm

(57) ABSTRACT

A simultaneous interpretation system using a translation unit bilingual corpus includes a microphone configured to receive an utterance of a user, a memory in which a program for recognizing the utterance of the user and generating a translation result is stored, and a processor configured to execute the program stored in the memory, wherein the processor executes the program so as to convert the received utterance of the user into text, store the text in a speech recognition buffer, perform translation unit recognition with respect to the text on the basis of a learning model for translation unit recognition, and in response to the translation unit recognition being completed, generate a translation result corresponding to the translation unit on the basis of a translation model for translation performance.

15 Claims, 18 Drawing Sheets

(51) Int. Cl.
 *G10L 15/22* (2006.01)
 *G06F 40/253* (2020.01)
 *G10L 13/00* (2006.01)
 *G10L 15/26* (2006.01)

(56) References Cited

U.S. PATENT DOCUMENTS

| | | | |
|---|---|---|---|
| 9,830,318 B2 | 11/2017 | Waibel | |
| 2004/0230418 A1* | 11/2004 | Kitamura | G06F 40/45 704/8 |
| 2006/0116865 A1* | 6/2006 | Cheng | G06F 40/45 704/2 |
| 2007/0203689 A1* | 8/2007 | Wu | G06F 40/211 704/2 |
| 2008/0004863 A1* | 1/2008 | Moore | G06F 40/45 704/4 |
| 2008/0091407 A1* | 4/2008 | Furihata | G10L 15/26 704/4 |
| 2008/0154577 A1* | 6/2008 | Kim | G06F 40/45 704/2 |
| 2008/0300857 A1* | 12/2008 | Barbaiani | G06F 40/45 704/4 |
| 2008/0306725 A1* | 12/2008 | Moore | G06F 40/45 704/2 |
| 2009/0326916 A1* | 12/2009 | Gao | G06F 40/284 704/4 |
| 2010/0088085 A1* | 4/2010 | Jeon | G06F 40/44 704/7 |
| 2011/0087484 A1 | 4/2011 | Lee | |
| 2011/0093254 A1* | 4/2011 | Kuhn | G06F 40/103 704/2 |
| 2015/0073796 A1 | 3/2015 | Kim et al. | |
| 2015/0134320 A1* | 5/2015 | Rangarajan Sridhar | G10L 15/005 704/2 |
| 2015/0186361 A1* | 7/2015 | Su | G06F 40/45 704/2 |
| 2017/0068665 A1* | 3/2017 | Tamura | G06F 40/44 |
| 2018/0075023 A1* | 3/2018 | Kim | G06F 40/289 |

\* cited by examiner

|  | 애플은 | 정확한 | 날짜를 | 확정하지는 | 않았다. | 첫 | 번째 | 인텔 | 머신에대해서는 | 언제 | 도착할지 | 6월까지 | 판매한다고는하지만 |
|---|---|---|---|---|---|---|---|---|---|---|---|---|---|
| apple | ○ | | | | | | | | | | | | |
| has | | | | | ○ | | | | | | | | |
| not | | | | | ○ | | | | | | | | |
| pinned | | | | ○ | | | | | | | | | |
| an | | ○ | | | | | | | | | | | |
| exact | | ○ | | | | | | | | | | | |
| date | | | ○ | | | | | | | | | | |
| when | | | | | | | | | ○ | | | | |
| the | | | | | | ○ | | | | | | | |
| first | | | | | | ○ | | | | | | | |
| intel | | | | | | | ○ | | | | | | |
| machines | | | | | | | | ○ | | | | | |
| will | | | | | | | | | | ○ | ○ | | |
| arrive | | | | | | | | | | ○ | ○ | | |
| saying | | | | | | | | | | | | | ○ |
| only | | | | | | | | | | | | | ○ |
| that | | | | | | | | | | | | ○ | |
| they | | | | | | | | | | | | ○ | |
| should | | | | | | | | | | | | ○ | |
| be | | | | | | | | | | | | ○ | |
| on | | | | | | | | | | | | ○ | |
| the | | | | | | | | | | | ○ | | |
| market | | | | | | | | | | | ○ | | |
| by | | | | | | | | | | | | | |
| june | | | | | | | | | | | | | |

SIMULTANEOUS INTERPRETATION SYSTEM AND METHOD USING TRANSLATION UNIT BILINGUAL CORPUS

CROSS-REFERENCE TO RELATED APPLICATION

This application claims priority to and the benefit of Korean Patent Application No. 2018-0144592, filed on Nov. 21, 2018, the disclosure of which is incorporated herein by reference in its entirety.

BACKGROUND

1. Field of the Invention

The present invention relates to a simultaneous interpretation system and method using a translation unit bilingual corpus.

2. Description of Related Art

A simultaneous interpretation system performs interpretation by recognizing a user's speech continuously uttered in real time and automatically translating the speeches.

When compared with the conventional sequential interpretation in which inputs are received sentence by sentence, the simultaneous interpretation system requires a function of recognizing a translation unit by recognizing a range of a sentence for the continuous utterances. The conventional method of recognizing a translation unit mainly uses a method of estimating an end position of a sentence through a sentence segmentation algorithm and performing translation.

In this case, when the range of a sentence is significantly long, an excessive delay occurs, so there is a need to recognize a sub-sentence as a translation unit to be translated. However, when the sub-sentence is recognized as a translation unit or is translated according to the conventional method, the translation result may be incomplete or awkward.

That is, processes of recognizing a translation unit from a sentence, performing translation on the translation unit, and post-processing the translation result are needed, and to this end, a learning corpus that is divided into translation units is needed.

Since there is a neural network-based translation technology for dividing a sentence into translation units at the same time as performing translation, the core process for producing a simultaneous interpreter is generating a learning corpus that is divided into translation units for simultaneous interpretation.

However, the majority of generally used bilingual corpuses are translated by sentences. And even when a translation unit is detected in the source language in the bilingual corpus, if the translation unit has a greatly different word order, such as in an English-Korean translation, it is difficult to find a translation result corresponding to the translation unit in the bilingual corpus so as to generate a bilingual corpus having translation units composed of sub-sentences.

SUMMARY OF THE INVENTION

The present invention aims to a simultaneous interpretation system and method that is capable of generating a translation unit bilingual corpus for simultaneous interpretation from the existing sentence separated bilingual corpus, learning a learning model for translation unit recognition and a translation model for translation based on the translation units, and generating a simultaneous translation result in translation with respect to a user's utterance.

The technical objectives of the present invention are not limited to the above, and other objectives may become apparent to those of ordinary skill in the art based on the following descriptions.

According to the first aspect of the present invention, there is provided a simultaneous interpretation system using a translation unit bilingual corpus, the simultaneous interpretation system including: a microphone configured to receive an utterance of a user; a memory in which a program for recognizing the utterance of the user and generating a translation result is stored; and a processor configured to execute the program stored in the memory, wherein the processor executes the program so as to convert the received utterance of the user into a sentence range text, store the sentence range text in a speech recognition buffer, perform translation unit recognition with respect to the sentence range text on the basis of a learning model for translation unit recognition, and in response to the translation unit recognition being completed, generate a translation result corresponding to the translation unit on the basis of a translation model for translation performance.

The simultaneous interpretation system may further include an output unit including at least one of a loudspeaker configured to output the translation result as a speech and a display configured to output the translation result on a screen.

The processor may generate a translation unit bilingual corpus including at least one of translation unit segmentation information for distinguishing each translation unit and sentence segmentation information for distinguishing each sentence from the sentence separated bilingual corpus, and learn the learning model for translation unit recognition and the translation model on the basis of the generated translation unit bilingual corpus.

When a source language is Korean and a target language is English, the processor may perform word alignment on words corresponding to each other between the source language and the target language with respect to the sentence separated bilingual corpus, recognize a translation unit on the basis of syntax information of at least one of the source language and the target language subjected to the word alignment, and adjust a word order of the target language on the basis of the recognized translation unit with respect to the word aligned result so as to generate the translation unit bilingual corpus.

When a partial dependency tree of a verb or a noun in a result of dependency structure parsing of the source language has a word length (a syntactic word in the case of Korean) longer than or equal to a predetermined word length, the processor may recognize the partial dependency tree as the translation unit.

When a nearby translation unit generated by the recognized translation unit has a word length shorter than a predetermined word length, the processor may exclude a currently recognized translation unit candidate and recognize a partial dependency tree arranged later as a translation unit representing a candidate for translation.

The processor may perform a post-processing process of generating an ending corresponding to the word order adjusted target language, which is Korean, for smooth translation so as to generate the translation unit bilingual corpus.

The processor may recognize a translation unit segmentation point and a sentence segmentation point with respect to a word stream entering the speech recognition buffer on the basis of the translation unit segmentation information and the sentence segmentation information, and add a translation unit divided by the translation unit segmentation point and the sentence segmentation point to a translation unit buffer.

The processor may recognize the translation unit segmentation point and the sentence segmentation point for a current position on the basis of word information of words input into the speech recognition buffer up to a current point of time and information about 'n' look-ahead words.

The processor may perform word alignment on words corresponding to each other between a source language and a target language with respect to the sentence separated bilingual corpus, recognize a translation unit on the basis of syntax information of at least one of the source language and the target language subjected to the word alignment, and simultaneously adjust a word order of the source language and a word order of the target language on the basis of the recognized translation unit with respect to the word aligned result so as to generate the translation unit bilingual corpus.

When a partial dependency tree including a verb- or noun-dependent word in a result of dependency structure parsing of the target language has a word or syntactic word length longer than or equal to a predetermined word length, the processor may recognize the partial dependency tree as the translation unit.

The processor may recognize a translation unit beginning point, a translation unit segmentation point, and a sentence segmentation point with respect to a remaining sentence buffer that stores an incoming word stream as a result of the speech recognition, wherein the processor may be configured to: recognize the translation unit segmentation point and the sentence segmentation point for a current position on the basis of word information of words input into the remaining sentence buffer up to a current point of time and information about n look-ahead words, and while using the translation unit segmentation point as an ending point, recognize the translation unit beginning point on the basis of word information of words before the ending point and information about n look-ahead words.

The processor may add a translation unit that is recognized in a remaining sentence on the basis of the translation unit segmentation point and the translation unit beginning point to a translation unit accumulation result recognized up to a previous point of time so as to generate a translation unit accumulation result recognized up to a current point of time, and remove the translation unit from the remaining sentence.

The processor may perform translation on the translation unit accumulation result recognized up to the current point of time, and remove a translation result of the translation unit accumulation result recognized up to the previous point of time from the translation on the translation unit accumulation result recognized up to the current point of time, to generate a translation result of the currently recognized translation unit. The processor may perform translation-unit based translation on the translation unit accumulation result recognized up to the current point of time, on the basis of the translation unit accumulation result recognized up to the current point of time and the translation result translated up to the previous point of time in the sentence, and remove the translation unit accumulation result recognized up to the current point of time from the concatenated residual sentence.

According to the second aspect of the present invention, there is provided a simultaneous interpretation method using a translation unit bilingual corpus, the simultaneous interpretation method including: receiving an utterance of a user; converting the received utterance of the user into text and storing the text in a speech recognition buffer; performing translation unit recognition with respect to the text on the basis of a learning model for translation unit recognition; and in response to the translation unit recognition being completed, generating a translation result corresponding to the translation unit on the basis of a translation model for translation performance.

The simultaneous interpretation method may further include: generating a translation unit bilingual corpus including at least one of translation unit segmentation information for distinguishing each translation unit and sentence segmentation information for distinguishing each sentence from a sentence separated bilingual corpus; and learning the learning model for translation unit recognition and the translation model on the basis of the generated translation unit bilingual corpus, wherein the generating of the translation unit bilingual corpus may include: performing word alignment on words corresponding to each other between a source language and a target language with respect to the sentence separated bilingual corpus; recognizing a translation unit on the basis of syntax information of at least one of the source language and the target language subjected to the word alignment; and adjusting at least one of a word order of the source language and a word order of the target language on the basis of the recognized translation unit with respect to the word aligned result so as to generate the translation unit bilingual corpus.

The performing of translation unit recognition with respect to the speech recognition text on the basis of the learning model for translation unit recognition may include: recognizing a translation unit segmentation point, a sentence segmentation point, and a translation unit beginning point with respect to text stored in the speech recognition buffer on the basis of the translation unit segmentation information and the sentence segmentation information; and adding a translation unit divided by the translation unit segmentation point, the sentence segmentation point, and the translation unit beginning point to a translation unit buffer.

BRIEF DESCRIPTION OF THE DRAWINGS

FIGS. 6A to 6C are diagrams for describing a process of adjusting a word order with respect to a translation unit.

FIGS. 10A and 10B are diagrams for describing a process of adjusting word order with respect to a translation unit.

DETAILED DESCRIPTION OF EXEMPLARY EMBODIMENTS

Figure 1:
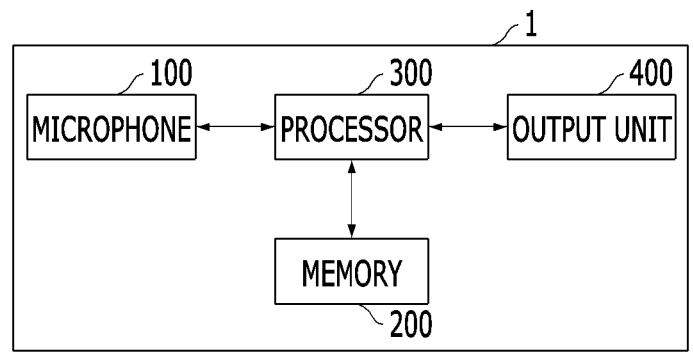
FIG. 1 is a block diagram illustrating a simultaneous interpretation system according to an embodiment of the present invention.

Hereinafter, embodiments of the present invention will be described in detail with reference to the accompanying drawings so that those skilled in the art may easily carry out the present invention. The present invention may be embodied in various forms and is not to be construed as limited to the embodiments set forth herein. In the drawings, parts irrelevant to the description have been omitted for the clarity of explanation It should be further understood that the terms "comprise," "comprising," "include," and/or "including," when used herein, specify the presence of stated features, integers, steps, operations, elements, components and/or groups thereof, and do not preclude the presence or addition of one or more other features, integers, steps, operations, elements, components, and/or groups thereof.

FIG. 1 is a block diagram illustrating a simultaneous interpretation system 1 according to an embodiment of the present invention.

The simultaneous interpretation system 1 according to the embodiment of the present invention includes a microphone 100, a memory 200, a processor 300, and an output unit 400.

The microphone 100 receives a user's utterance. The utterance input into the microphone 100 or a result of simultaneous interpretation for the utterance may be output through the output unit 400 including at least one of a loudspeaker for outputting a speech and a display for outputting a screen.

The memory 200 is configured to store a program for recognizing a user's utterance and generating a translation result. In addition, the memory 200 is configured to store a learning model M1 for recognizing a translation unit and a translation model M2 for performing translation.

In this case, the memory 200 collectively refers to a nonvolatile storage device, which keeps stored information even when power is not supplied, and a volatile storage device.

For example, the memory 200 may include a NAND flash memory such as a compact flash (CF) card, a secure digital (SD) card, a memory stick, a solid-state drive (SSD), and a micro SD card, a magnetic computer storage device such as a hard disk drive (HDD), and an optical disc drive such as a compact disc read only memory (CD-ROM) and a digital versatile disc (DVD)-ROM.

The processor 300 executes a program stored in the memory 200 so as to convert the user's utterance input through the microphone 100 into text and store the text in a buffer. In addition, the processor 300 performs translation unit recognition with respect to the text on the basis of the learning model M1 for translation unit recognition, and in response to the translation unit recognition being completed, generates a translation result corresponding to the translation unit for the user's utterance on the basis of the translation model M2 for translation performance.

Hereinafter, a detailed process performed by the processor 300 will be described with reference to FIG. 2.

Figure 2:
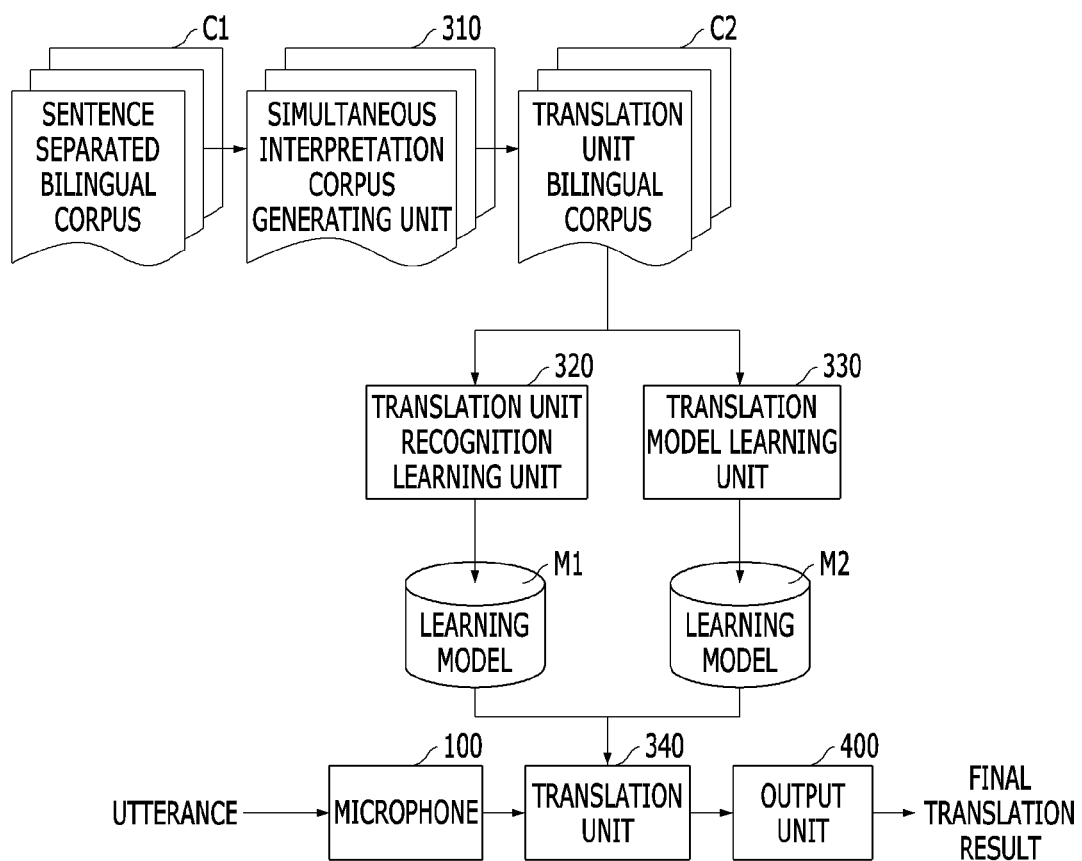
FIG. 2 is a diagram for describing the functions of a simultaneous interpretation system according to an embodiment of the present invention.
Figure 3:
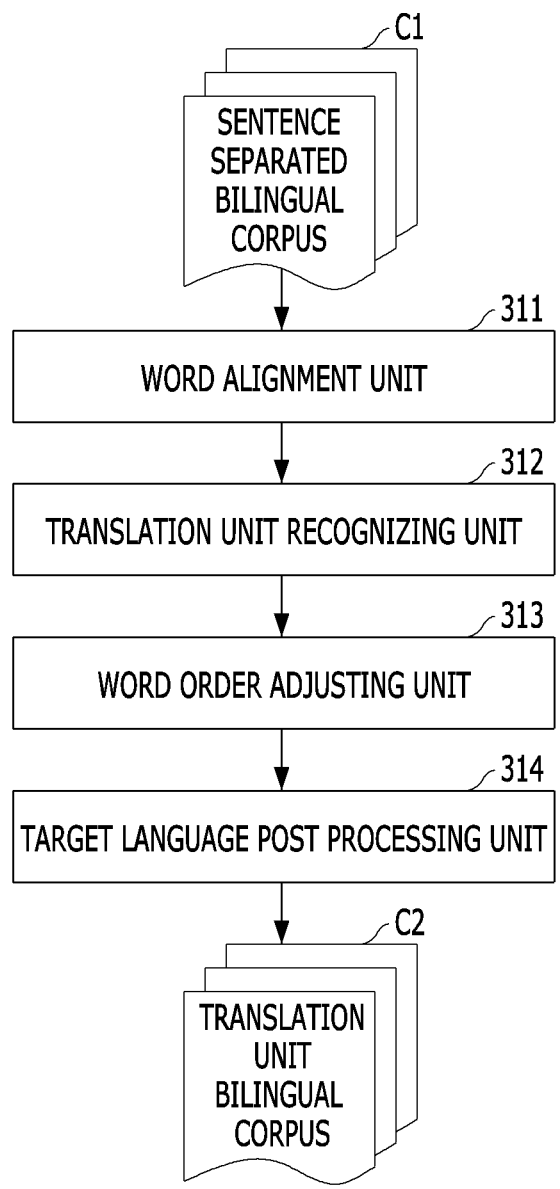
FIG. 3 is a diagram for describing a simultaneous interpretation corpus generating unit according to an embodiment of the present invention.
Figure 4:
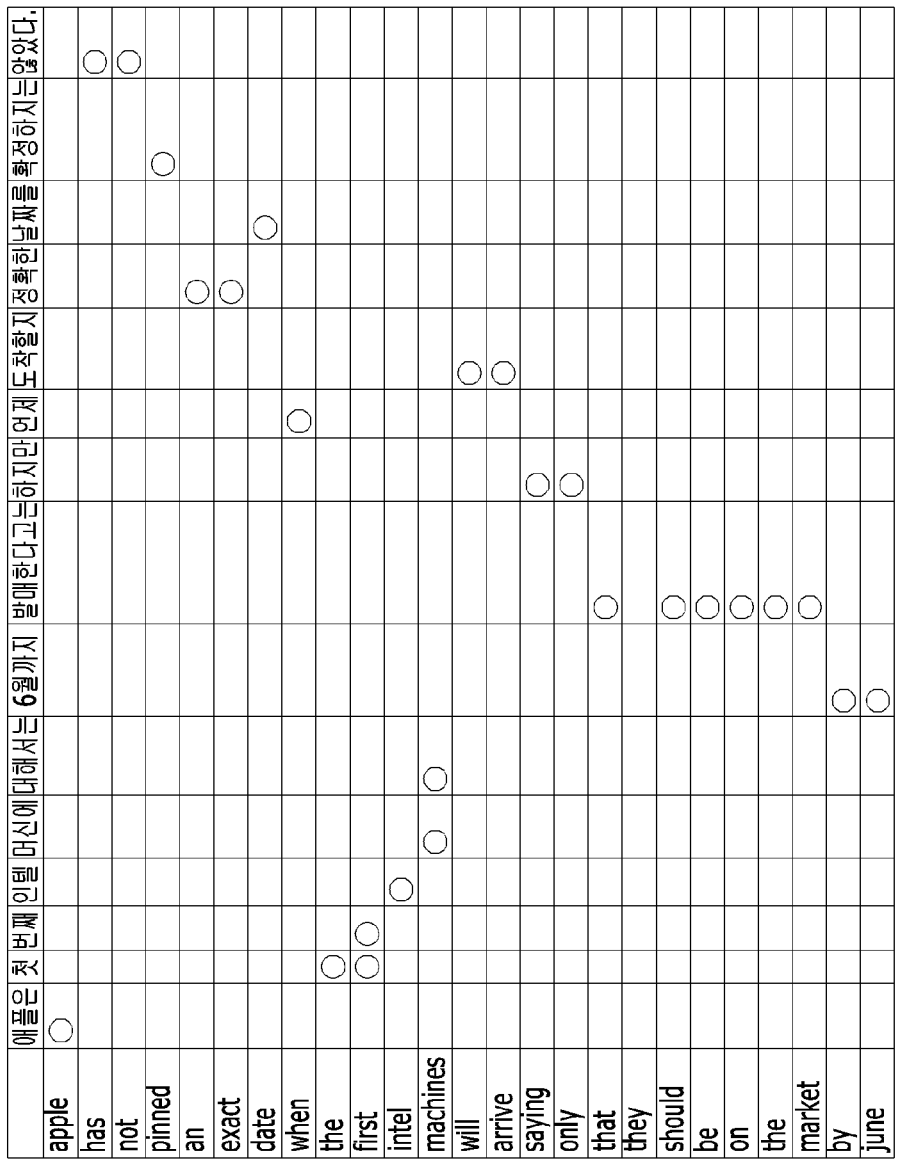
FIG. 4 is a diagram illustrating a result of word alignment with respect to a source language and a target language.
Figure 5:
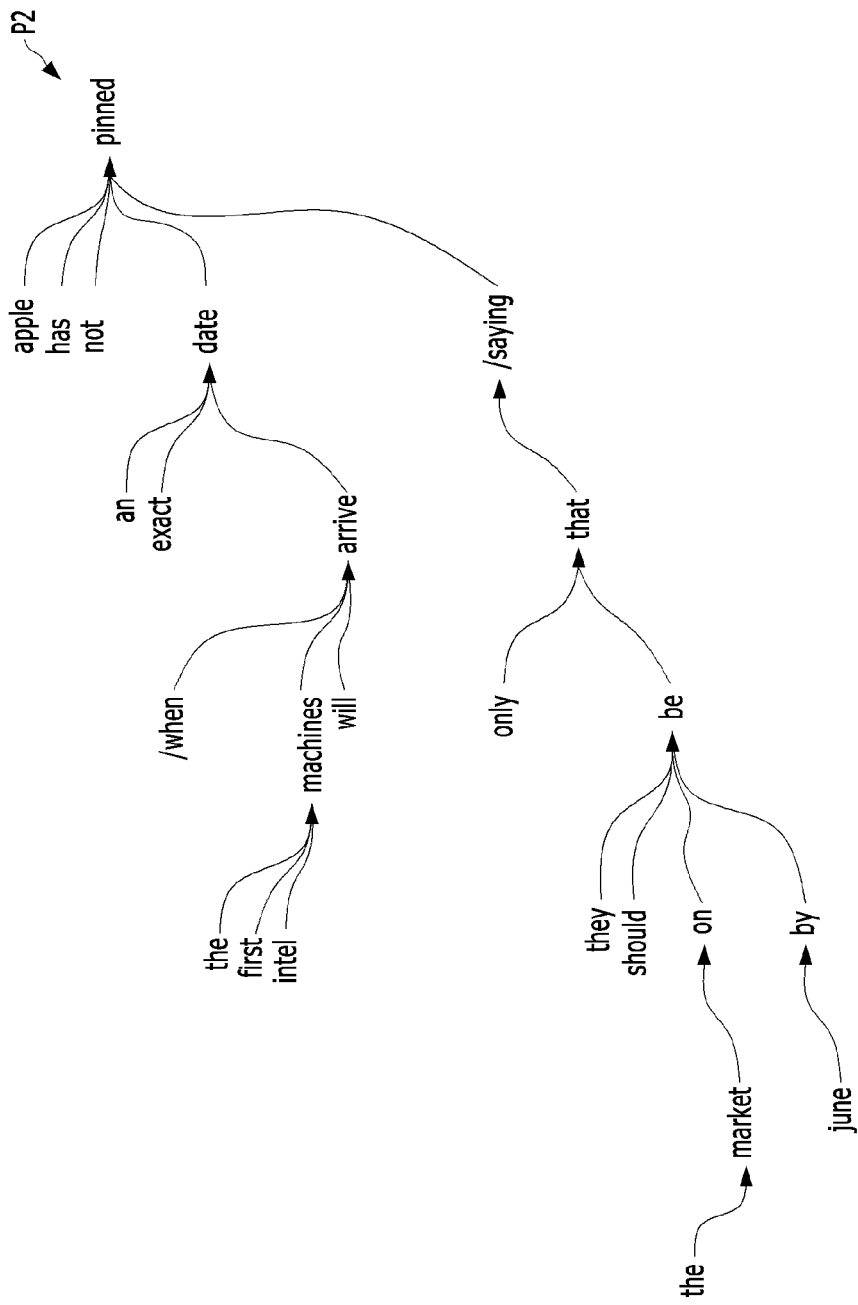
FIG. 5 is a diagram for describing a process of recognizing a translation unit according to a dependency structure.
Figure 6A:
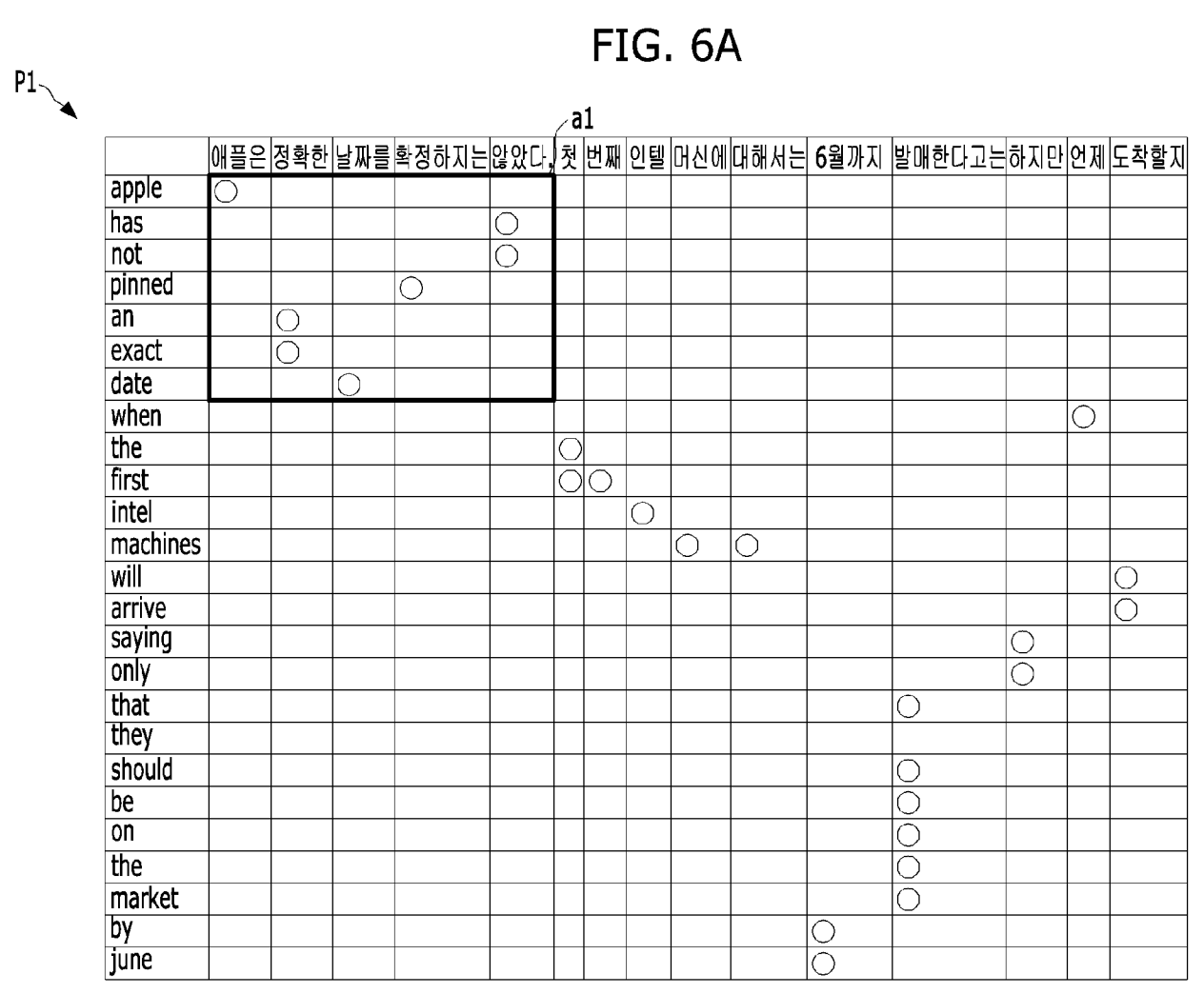
Figure 6C:
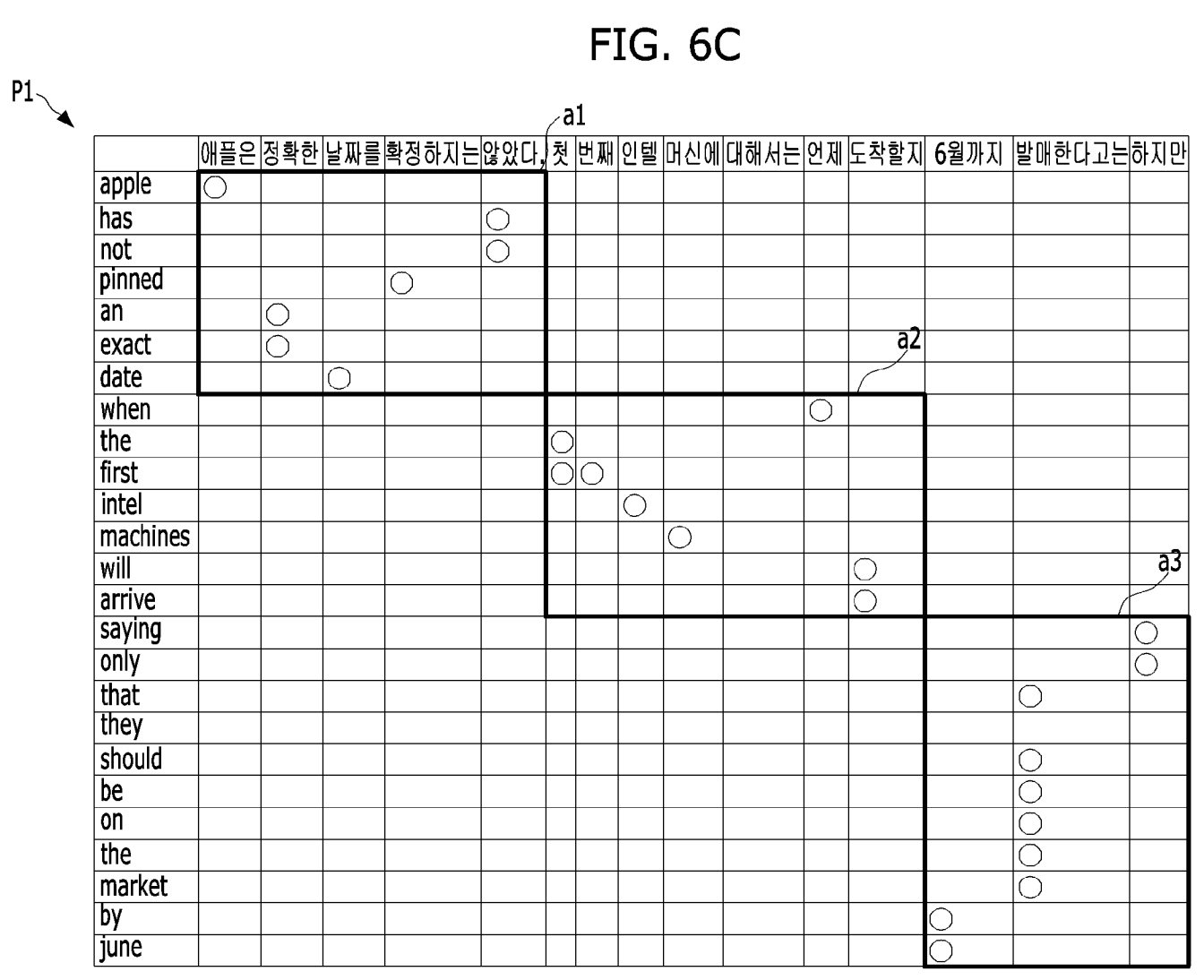

FIG. 2 is a diagram for describing the functions of the simultaneous interpretation system 1 according to the embodiment of the present invention. FIG. 3 is a diagram for describing a simultaneous interpretation corpus generating unit 310 according to the embodiment of the present invention. FIG. 4 is a diagram illustrating a result of word alignment with respect to a source language and a target language. FIG. 5 is a diagram for describing a process of recognizing a translation unit according to a dependency structure. FIGS. 6A to 6C are diagrams for describing a process of adjusting a word order with respect to a translation unit.

Figure 9:
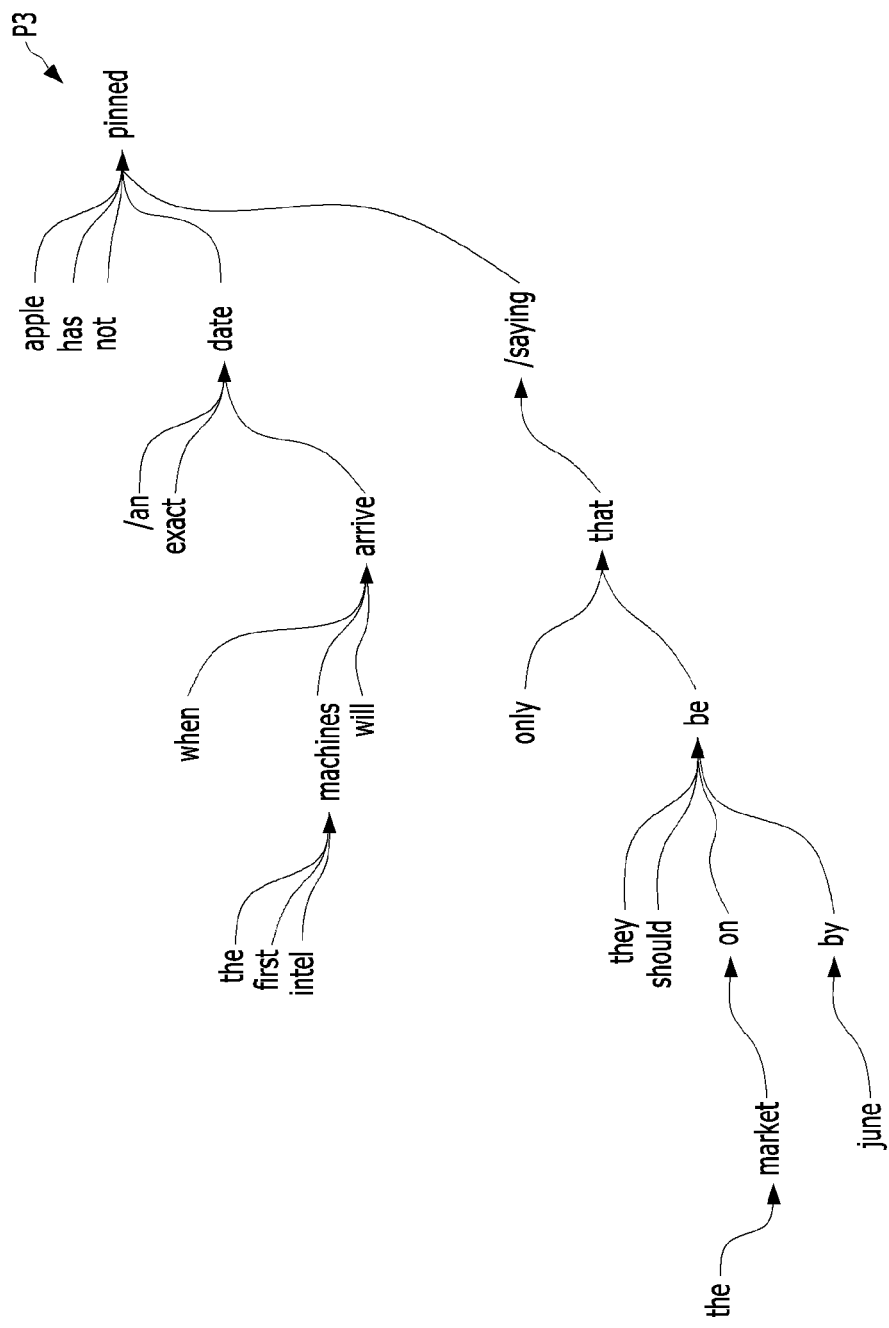
FIG. 9 is a diagram for describing a process of recognizing a translation unit according to a dependency structure.

Referring to FIGS. 3 to 6C, a case in which the source language is English and the target language is Korean is described first, and referring to FIG. 9 and subsequent drawings, a case in which the source language is Korean and the target language is English is described.

In the simultaneous interpretation system 1 according to the embodiment of the present invention, the processor 300 may include function blocks for performing functions of a simultaneous interpretation corpus generating unit 310, a translation unit recognition learning unit 320, a translation model learning unit 330, and a translation unit 340.

The simultaneous interpretation corpus generating unit 310 generates a translation unit bilingual corpus C2 having a sub-sentence as a translation unit from a sentence separated bilingual corpus C1, to minimize a translation delay.

In this case, the generated translation unit bilingual corpus C2 may include at least one of translation unit segmentation information for distinguishing translation units and sentence segmentation information for distinguishing sentences.

Referring to FIG. 3, the simultaneous interpretation corpus generating unit 310 may include function blocks of a word alignment unit 311, a translation unit recognizing unit 312, a word order adjusting unit 313, and a target language post processing unit 314.

The word alignment unit 311 performs word alignment on words corresponding to each other between a source language and a target language in a statistical manner for the sentence separated bilingual corpus C1. In this case, the word alignment unit 311 may employ a statistical method used in statistical machine translation (SMT).

On the other hand, an example of the source language and the target language for generating the translation unit bilingual corpus C2 according to the embodiment of the present invention is shown in Table 1 below.

TABLE 1

| | |
|---|---|
| Source language | "apple has not pinned an exact date when the first intel machines will arrive saying only that they should be on the market by june." |
| Target language | " 애플은 첫 번째 인텔 머신에 대해서는 6월 까지 발매한다고는 하지만 언제 도착할지 정확한 날짜를 정하지는 않았다." |

A word alignment result P1 between the source language and the target language for the above example is shown in FIG. 4.

Thereafter, the translation unit recognizing unit 312 recognizes a translation unit on the basis of syntax information of at least one of the source language and the target language that are subjected to the word alignment.

In this case, the translation unit recognizing unit 312 may perform dependency structure parsing, as a method of recognizing a translation unit in an English-Korean translation, on the English source language, and when a partial dependency tree of a verb or a noun in a result of the dependency structure parsing has a word length (or a syntactic word length in the case of Korean) longer than or equal to a predetermined word length, recognize the partial dependency tree as a translation unit.

FIG. 5 shows a result P2 of the dependency structure parsing for the source language shown in the above example, and the translation unit recognizing unit 312 determines a partial dependency tree in the dependency structure parsing result P2, whose word length is longer than or equal to N, to be a candidate for a translation unit.

In this case, the translation unit recognizing unit 312, when a nearby translation unit generated by the recognized translation unit has a word length shorter than N, excludes the currently recognized translation unit candidate and recognizes a partial tree arranged later as a translation unit representing a candidate for translation.

For example, when N is 7, a partial tree led by a source language word "date," that is, "an exact date when the first intel machines will arrive" may be a candidate for a translation unit.

However, when the corresponding partial dependency tree serves as a translation unit, a part "apple has not pinned" arranged before the translation unit candidate needs to be one translation unit. In this case, since the part "apple has not pinned" is not recognized as a translation unit due to being shorter than the predetermined word length of 7, and a partial tree led by "when" arranged later "when the first intel machines will arrive" is recognized as a single translation unit.

Thereafter, on arrival at "that" in the course of moving from "saying," a partial dependency tree "only that they should be on the market by june" has a word length of 10, but is not recognized as a translation unit since a previous translation unit "saying" does not satisfies the predetermined word length, resulting in "saying only that they should be on the market by june" being recognized as a translation unit.

The translation units (segments) finally recognized through the above process are as follows:

(1) apple has not pinned an exact date (2) when the first intel machines will arrive (3) saying only that they should be on the market by june Thereafter, the word order adjusting unit 313 adjusts the word order of the target language with respect to the word aligned result P1 on the basis of the recognized translation units to generate the translation unit bilingual corpus C2. That is, the word order adjusting unit 313 collects distributed syntax structures with respect to the recognized translation units to facilitate arrangement between the translation units.

In the word alignment result P1 shown in FIG. 4, translation results corresponding to the translation unit (1) "apple has not pinned an exact date" are in a distributed state. Accordingly, the word order adjusting unit 313 performs word order adjustment such that the translation results are collected as a single aggregated unit (a1) as shown in FIG. 6A.

Since translation results corresponding to the translation unit (2) "when the first intel machines will arrive" are also in a distributed state, the word order adjusting unit 313 performs word order adjustment such that the translation results are collected as a single aggregated unit (a2) as shown in FIG. 6B similar to FIG. 6A.

Since a target part corresponding to the translation unit (3) "saying only that they should be on the market by june" is already in a collected state (a3) as shown in FIG. 6B, the word order adjusting unit 313 does not need to perform word order adjustment.

FIG. 6C shows a corresponding relationship of the translation units between the source language and the target language according to an alignment relationship after word order adjustment, and when the word order is adjusted, the processor 300 generates the translation unit bilingual corpus C2 arranged in translation units as shown below.

TABLE 2

| Source language | (1) apple has not pinned an exact date |
| --- | --- |
| | (2) when the first intel machines will arrive |
| | (3) saying only that they should be on the market by june |
| Target language | (1) 애플은 정확한 날짜를 확정하지는 않았다 (10) |
| | (2) 첫 번째 인텔 머신에 대해서는에 대해서는 (12) |
| | (3) 월까지 발매한다고는 하지만 (14) |

Thereafter, the target language post processing unit 314 performs a post-processing process for generating an ending corresponding to the target language whose word order is adjusted.

For example, the target language post processing unit 314 generates an ending for the target language whose word order is adjusted such that the target language becomes a natural sentence. In other words, since sentences 12 and 14 in Table 2 are not complete sentences, endings are added as shown in Table 3 to generate natural sentences. The ending refers to a sentence constituent element used to generate a Korean sentence in a completed form. The translation unit bilingual corpus C2 for the purpose of English-Korean simultaneous interpretation finally generated according to the above described process by the simultaneous interpretation corpus generating unit 310 is shown in Table 3 below. In this case, <seg> denotes a translation unit segmentation point and <eos> denotes a sentence range ending point.

TABLE 3

| Source language | apple has not pinned an exact date <seg> when the first intel machines will arrive <seg> saying only that they should be on the market by june <eos> |
| --- | --- |
| Target language | 애플은 정확한 날짜를 확정하지는 않았다. <seg> 첫 번째 인텔 머신에 대해서는 언제 도착할지 말았니다. <seg> 6월까지 발매한다고는 하지만요. <eos> |

In Table 3, when compared with Table 2, the first sentence of the target language (i.e., Korean) "애플은 정확한 날 짜를 확정하지 는 않았다 (10)" is already a compete sentence, and thus an ending for a completed form is not added; the second sentence "첫 번째 인텔 머신 에 대해서는 언제 도착할지 (12)" is not a complete sentence in the Korean language system, and thus an ending "말앙니다" for a completed form is added; and the third sentence "6월까지 발매한, 다고는 하지만 (14)" is also not a complete sentence, and thus an ending "요" for a completed form is added.

Referring again to FIG. 2, the translation unit recognition learning unit 320 generates a learning model M1 for recognizing a translation unit through learning from the translation unit bilingual corpus C2 including at least one of the translation unit segmentation information and the sentence segmentation information generated as above.

In addition, the translation model learning unit 330 generates a translation model M2 for performing translation through learning from the translation unit bilingual corpus C2 through a neural network-based algorithm.

The translation unit 340 converts a user's utterance into sentence-unit text and stores the sentence-unit text in a buffer, recognizes a translation unit by receiving the text word by word, and performs translation in real time.

Hereinafter, on the basis of the above-described example and practice, a specific translation process performed by the processor 300 in the embodiment of the present invention will be described with reference to FIGS. 7 to 8.

Figure 7:
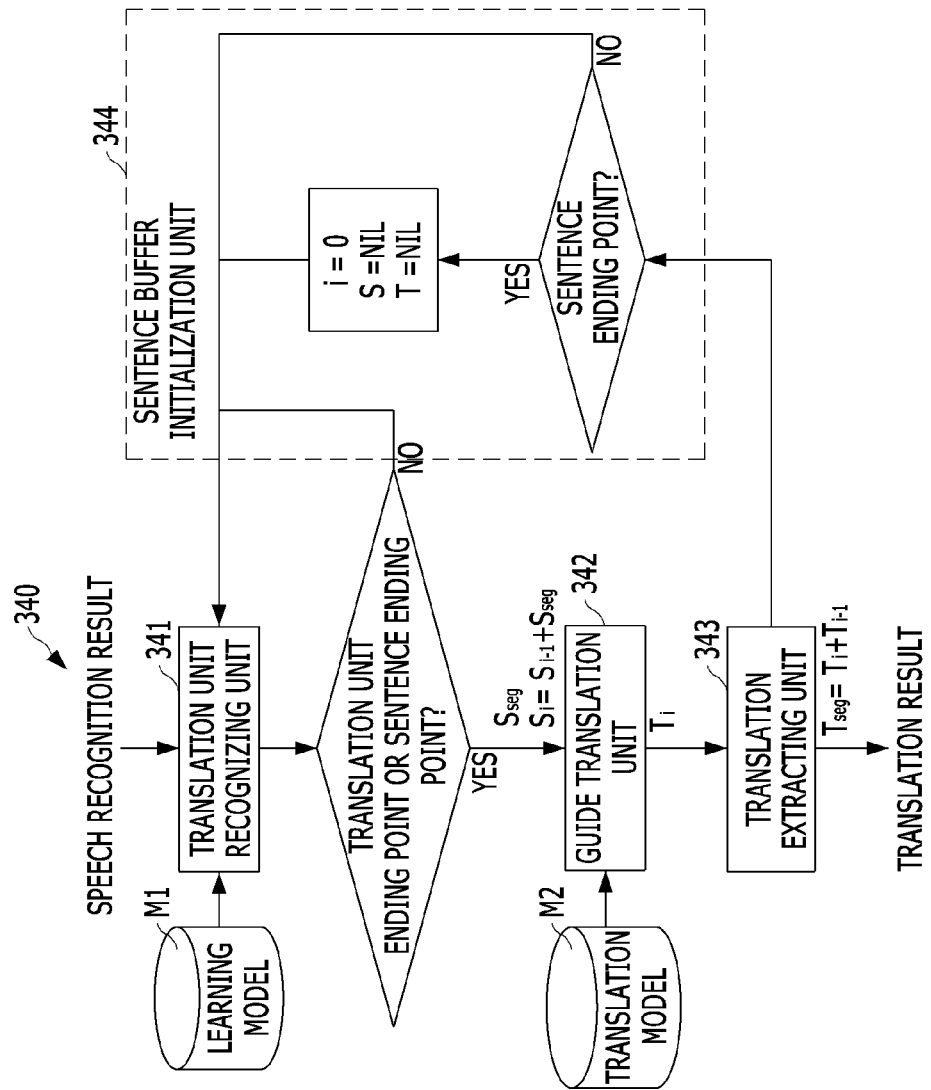
FIG. 7 is a diagram for describing the functions of a translation unit according to an embodiment of the present invention.
Figure 8A:
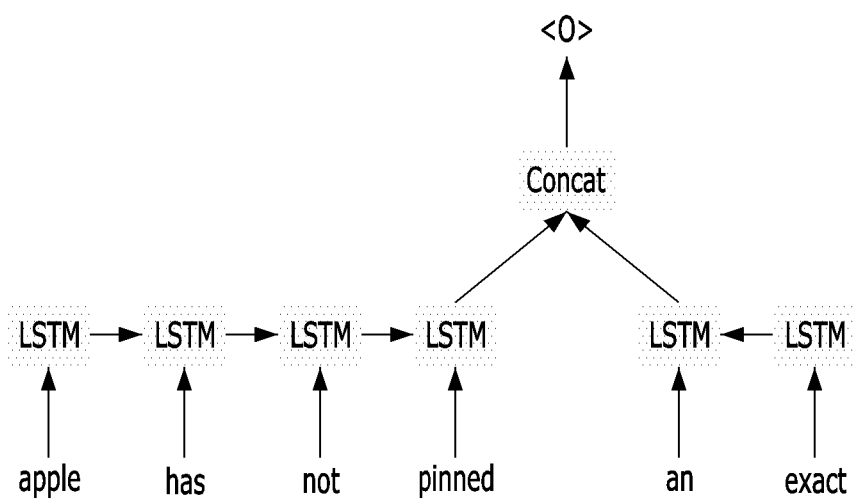
FIGS. 8A and 8B are diagrams for describing a process of classifying a translation unit segmentation point, a sentence segmentation point, and the other case using a long short-term memory-recurrent neural network (LSTM-RNN).
Figure 8B:
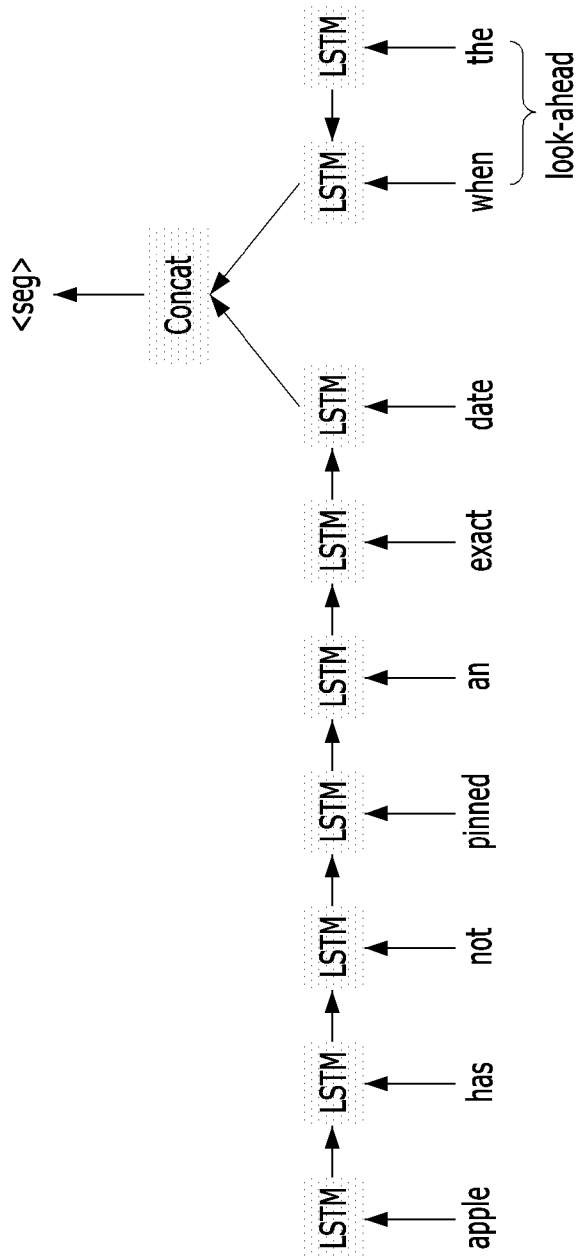

FIG. 7 is a diagram for describing the functions of the translation unit 340 according to the embodiment of the present invention. FIGS. 8A and 8B are diagrams for describing a process of classifying a translation unit segmentation point, <seg>, a sentence segmentation point, <eos>, and the other case, <0>, by using a long short-term memory-recurrent neural network (LSTM-RNN).

The translation unit 340 according to the embodiment of the present invention may include a translation unit recognizing unit 341, a guide translation unit 342, a translation extracting unit 343, and a buffer initialization unit 344.

The translation unit recognizing unit 341 sequentially reads words from a buffer in which the sentence-unit text corresponding to the user's utterance is stored, and recognizes a translation unit segmentation point <seg> and a sentence segmentation point <eos> for the read sentence-unit text using the learning model M1 for translation unit learning.

In this case, the translation unit recognizing unit 341 may recognize the translation unit segmentation point <seg> and the sentence segmentation point <eos> for the current position, on the basis of word information of words input up to the current point of time and information about n look-ahead words. Here, the translation unit recognizing unit 341 determines whether the current position is a translation unit segmentation point <seg> or a sentence segmentation point <eos> by referring to the n look-ahead words. This is because when the subsequent context is referred to, the determination becomes clear.

For example, a source language corpus for translation unit recognition learning may be provided as follows.

Source Language:
apple/0 has/0 not/0 pinned/0 an/0 exact/0 date/seg when/0 the/0 first/0 intel/0 machines/0 will/0 arrive/seg saying/0 only/0 that/0 they/0 should/0 be/0 on/0 the/0 market/0 by/0 june/eos Some/0 analysts/0

If the number of look-ahead words is 2, the translation unit recognizing unit 341 may classify the text into a translation unit segmentation point <seg>, a sentence segmentation point <eos>, and the other case <0> using a bi-directional LSTM-RNN as shown in FIGS. 8A, 8B.

That is, the translation unit recognizing unit 341 sequentially reads the words of the sentence-unit text stored in the buffer, and classifies the other case <0> as in FIG. 8A, a case in which the position of a corresponding word is a translation unit segmentation point <seg> as in FIG. 8B using the LSTM-RNN.

If it is determined as a result of the translation unit recognition that the current position corresponds to a translation unit segmentation point <seg> or a sentence segmentation point <eos>, the guide translation unit 342 adds the recognized translation unit to the buffer.

Thereafter, the guide translation unit 342 adds the currently recognized translation unit $S_{seg}$ to a previously recognized translation unit $S_{i-1}$, and while using a translation unit accumulation result $S_i=S_{i-1}+S_{seg}$ recognized up to the current point of time and a result $T_{i-1}$ translated up to the previous point of time in a sentence as inputs, performs a translation unit-based translation with respect to the translation unit accumulation result $S_i=S_{i-1}+S_{seg}$ recognized up to the current point of time.

In this case, the reason why the guide translation unit 342 adds the previously recognized translation unit $S_{i-1}$ in the sentence is that a translation unit is not an independent sentence so there is a need to refer to previous context.

When translating the translation unit (2) in the example of Table 2 above, the guide translation unit 342 has an input as follows.

$S_i$: "apple has not pinned an exact date when the first intel machines will arrive"

$T_i$: " 애플은 정확한 날짜 를 확정하지 는 않았다 " (10)

Thereafter, the guide translation unit 342 forcibly allocates a translation unit or a translation accumulation result stored in a buffer to a decoder result, and performs decoding subsequent to forcibly allocating a translation result so as to generate a target language.

That is, in the above example, when "apple has not pinned an exact date when the first intel machines will arrive", $S_i$, is provided as an input, "애플은 정확한 날 짜를 확정하 지는 않았다" (10), $T_i$, is output as a translation result, and in order to obtain a later translation result, there is a need to guide such that a previous translation result in the sentence is memorized and at the time of decoding, the previous translation result is generated together with the later translation result.

A method of guiding a previous translation result may be performed by adjusting the existing translation result to be assigned the first priority among translation candidates during beam search for decoding.

Thereafter, when the translation unit-based translation is completed, the translation extracting unit 343 removes the translation result $T_{i-1}$ translated up to the previous point of time in the sentence $T_i$-$T_{i-1}$ to generate a translation result corresponding to the currently recognized translation unit $T_{seg}$.

When the position of the current word corresponds to a sentence segmentation point <eos>, the buffer initialization unit 344 initializes the sentence range text and the translation unit-based translation result stored in the buffer. This is because the guide translation unit 342 performs translation on a sub-sentence in a sentence, rather than on the entire sentence.

With the respective function blocks described above, the entire translation process for the above-described example is as the following Table 4.

Figure 10A:
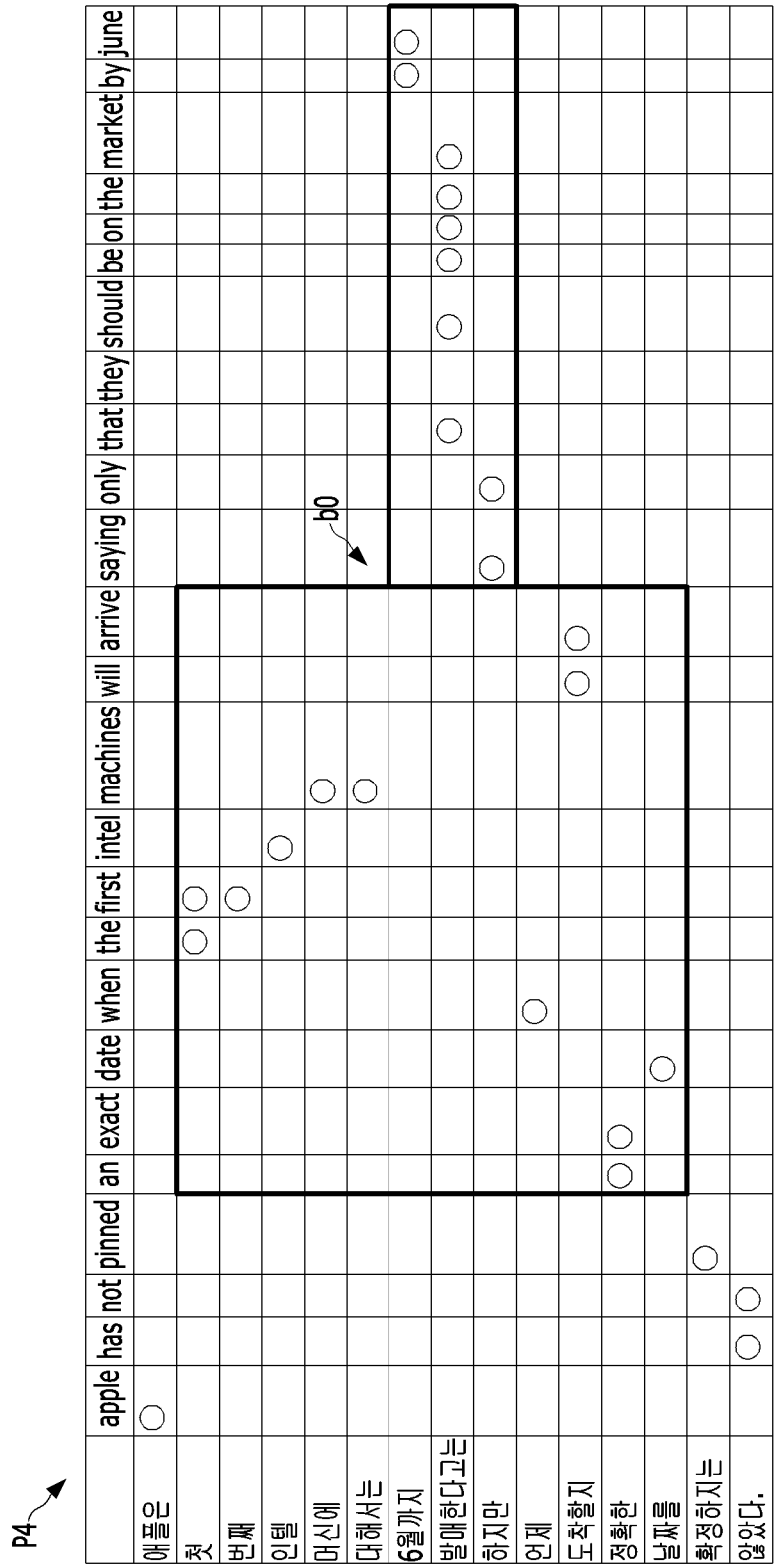
Figure 10B:
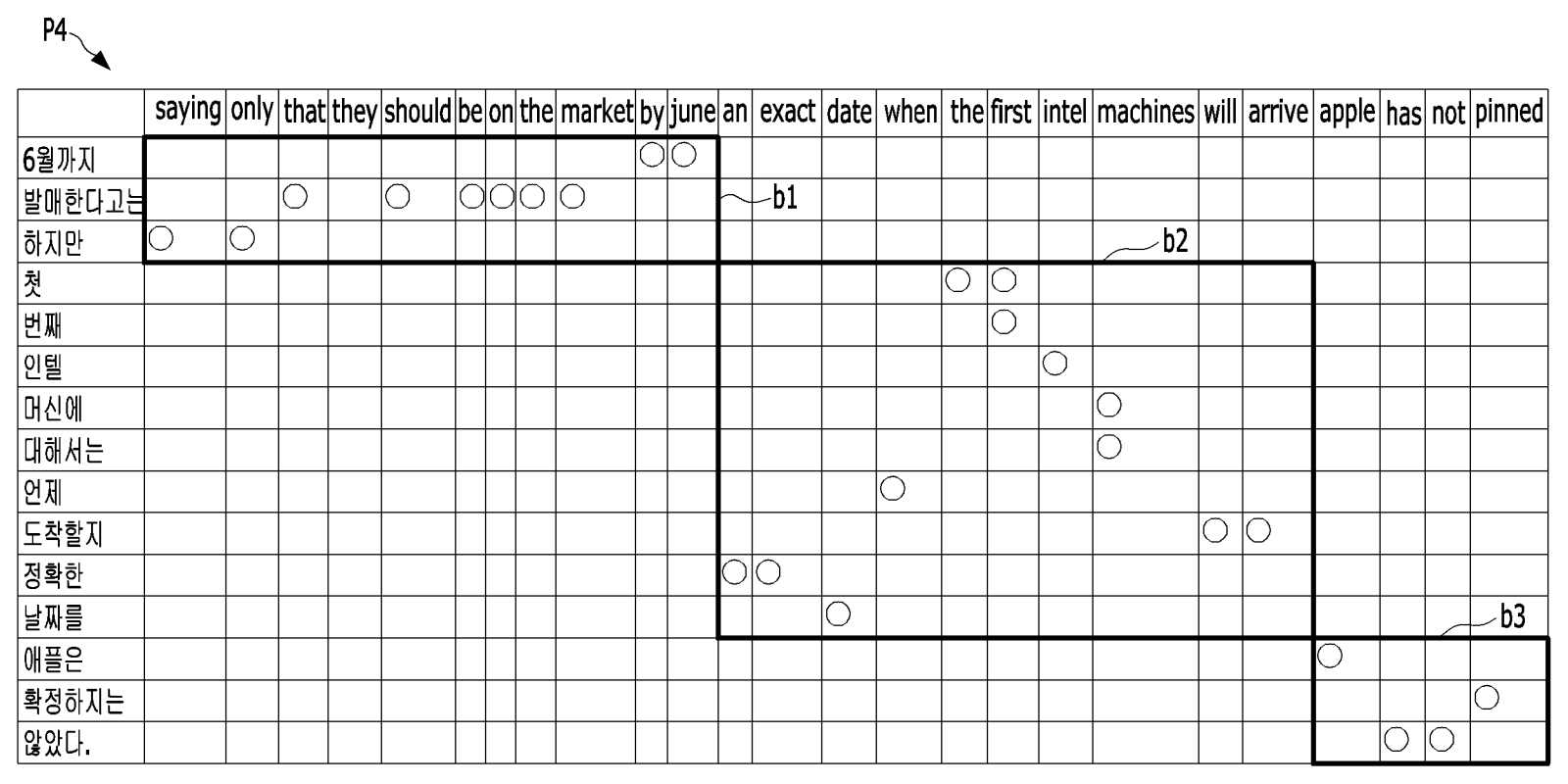

Hereinafter, referring to FIGS. 9 to 12, a case in which the source language is Korean and the target language is English will be described. However, the examples described with reference to FIG. 9 and subsequent drawings are not limited to a case in which the source language is Korean and the target language is English, and may be applied to the opposite case. FIG. 9 is a diagram for describing a process of recognizing a translation unit according to a dependency structure, and FIGS. 10A and 10B are diagrams for describing a process of adjusting the word order with respect to the translation unit.

TABLE 4

$S_0$: " "
$T_0$: " "
$S_{seg}$: "apple has not pinned an exact date"
$S_1$: "apple has not pinned an exact date"
$T_1$: "예를은 정확한 날짜를 확정하지는 않았다."
$T_{seg}$: "예를은 정확한 날짜를 확정하지는 않았다."
$S_{seg}$: "when the first intel machines will arrive"
$S_2$: "apple has not pinned an exact date when the first intel machines will arrive"
$T_2$: "예를은 정확한 날짜를 확정하지는 않았다.
첫 번째 인텔 머신에 대해서는 언제 도착할지 말입니다."
$T_{seg}$: "첫 번째 인텔 머신에 대해서는 언제 도착할지 말입니다."
$S_{seg}$: "saying only that they should be on the market by june"
$S_3$: "apple has not pinned an exact date when the first intel machines will arrive saying only that they should be on the market by june"
$T_3$: "'예를은 정확한 날짜를 확정하지는 않았다.
첫 번째 인텔 머신에 대해서는 언제 도착할지 말입니다.
6월까지 팔메한다고는 하지만요."
$T_{seg}$: "6월까지 팔메한다고는 하지만요."
$S_0$: " "
$T_0$: " "

Meanwhile, parts identical to those used for the simultaneous interpretation corpus generating unit 310, the translation unit recognition learning unit 320, the translation model learning unit 330, and the translation unit 340 as described above, will be omitted, and the following description will be made in relation to distinguishing parts.

As described above with reference to FIG. 3, the simultaneous interpretation corpus generating unit 310 may include function blocks of the word alignment unit 311, the translation unit recognizing unit 312, the word order adjusting unit 313, and the target language post processing unit 314.

The word alignment unit 311 performs word alignment on words corresponding to each other between the source language and the target language for the sentence separated bilingual corpus C1.

The translation unit recognizing unit 312 recognizes a translation unit on the basis of syntax information of at least one of the source language and the target language subjected to the word alignment. In this case, the translation unit recognizing unit 312 may perform dependency structure parsing on the source language or the target language, and when a partial dependency tree of a verb or a noun has a word length (a syntactic word length in the case of Korean) longer than or equal to a predetermined length, recognize the partial dependency tree as a translation unit. Here, which one of a source language syntax analysis result and a target language structure analysis result is used, whether a partial dependency tree of a noun is recognized as a translation unit, or the like depends on language characteristics, such as the freedom of word order.

The translation unit recognition will be described in relation to a case in which the source language and the target language are Korean and English, respectively, which are shown in the above described example of Table 1.

The overall process of the Korean-English translation is the same as that of the above-described English-Korean translation process, except for a method of generating a translation unit bilingual corpus through translation unit recognition.

One factor to be considered when recognizing a translation unit is that translation units should be arranged by adjusting the word order of a target sentence.

In the English-Korean translation, the word order of Korean is relatively free in Korean, and thus both the partial dependency tree of a verb and the partial dependency tree of a noun are available for the translation unit recognition, but in the Korean-English translation, the word order of English is relatively strict, and thus there is restriction on available translation units.

Accordingly, the Korean-English translation has a limitation that a partial dependency tree including words depending on a verb in a dependency structure analysis result of English should have a length longer than or equal to N and should not correspond to a noun clause. This is because, even though a noun clause recognized as a translation unit needs to be moveable in a sentence, the movement of noun clauses in English is extremely limited.

FIG. 9 shows a dependency structure parsing result P3 on the English target language in the above example, and the translation unit recognizing unit 312 determines that a partial dependency tree of a verb in the dependency structure parsing result P3, whose word length is longer than or equal to N, is a candidate for a translation unit.

As a result, parts (an exact date when the first intel machines will arrive) and (saying only that they should be on the market by june) are recognized as translation units, and a part (apple has not pinned) is automatically recognized as a translation unit.

Thereafter, with respect to a word aligned result P4, the word order adjusting unit 313 simultaneously adjusts the word order of the source language and the word order of the target language on the basis of the recognized translation unit to generate a translation unit bilingual corpus C2. That is, the word order adjusting unit 313 simultaneously moves the Korean word order and English word order on the basis of the Korean word order with respect to the partial dependency tree recognized as the translation unit.

Source language-target language pairs of translation units recognized in the above example are as follows and may be represented as in FIG. 10A.

("첫 번째 인텔 머신에 대해서는 6월까지 팔 매한다고는 하지만 (20)", "saying only that they should be on the market by June.")

("언제 도착할지 정확한 날짜를 (22)", "an exact date when the first intel machines will arrive")

In the source language-target language pairs b0 shown in FIG. 10A, both the source language and the target language are adjusted on the basis of the word order of the Korean, which is the source language. To this end, translation units of the target language are arranged on the basis of the last syntactic words of Korean syntactic words corresponding to the translation units of the target language. That is, in the case of the translation unit (saying only that they should be on the market by june), "하지만 (30)" is the last syntactic word corresponding thereto, in the case of the translation unit (an exact date when the first intel machines will arrive), "날짜를 (32)" is the last syntactic word corresponding thereto, and in the case of the translation unit (apple has not pinned), "않았다 (34)" is the last syntactic word corresponding thereto, and the translation units are arranged based on the order of the last syntactic words, resulting in (saying only that they should be on the market by june), (an exact date when the first intel machines will arrive), (apple has not pinned). In this case, Korean language is also subject to movement according to the order of the translation units of the target language. The result is shown as (b1, b2, b3) of FIG. 10B, and the final translation unit bilingual corpus for Korean-English or English-Korean simultaneous interpretation with respect to the above example is arranged as follows.

TABLE 5

| Source language | 6월까지 발매한 다고는 하지만 <seg><br>첫 번째,인텔 머신에 대해서는 언제 도착할지 정확한 날짜를 <seg><br>애플은 확정하지는 않았다 <eos> |
|---|---|
| Target language | saying only that they should be on the market by june <seg><br>an exact date when the first intel machines will arrive <seg><br>apple has not pinned. <eos> |

Thereafter, the target language post processing unit 314 performs a post-processing process for generating an ending corresponding to the target language whose word order is adjusted.

For example, the target language post processing unit 314 generates an ending for the target language whose word order is adjusted such that the target language becomes a natural sentence.

Hereinafter, a translation process using the translation unit bilingual corpus C2 generated according to FIGS. 9, 10A, and 10B will be described with reference to FIGS. 11 and 12 on the basis of the above described examples and practices.

Figure 11A:
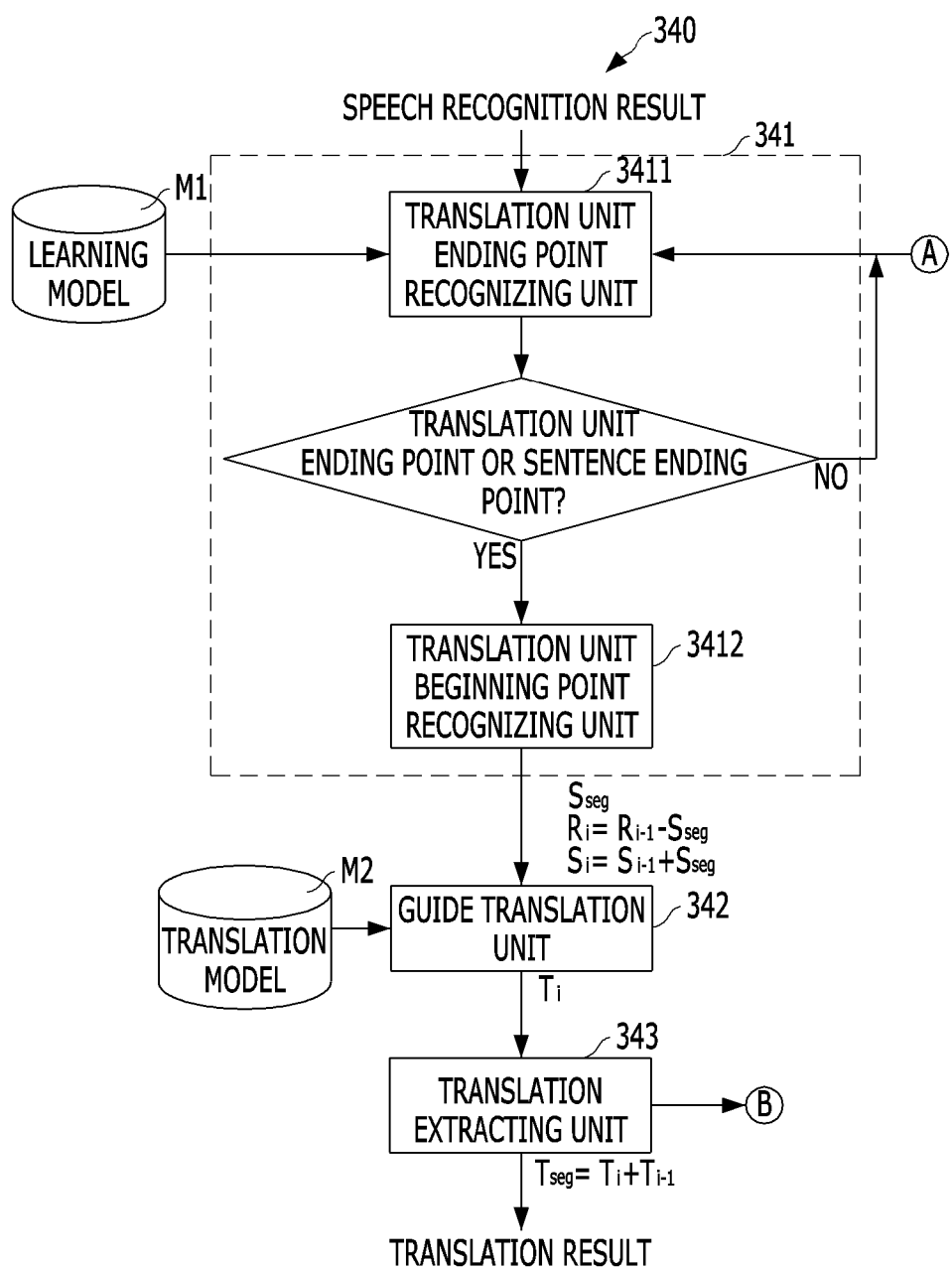
FIGS. 11A and 11B are diagrams for describing the functions of a translation unit according to another embodiment of the present invention.
Figure 11B:
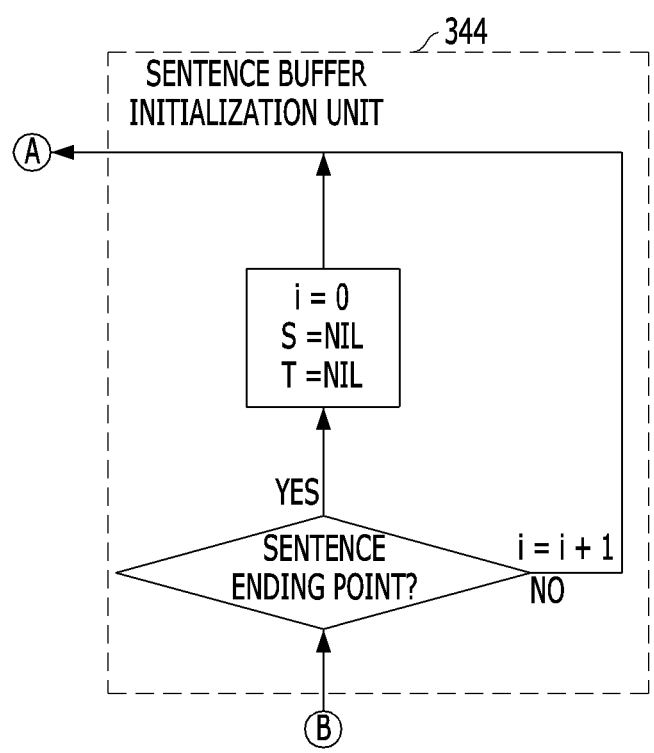
Figure 12A:
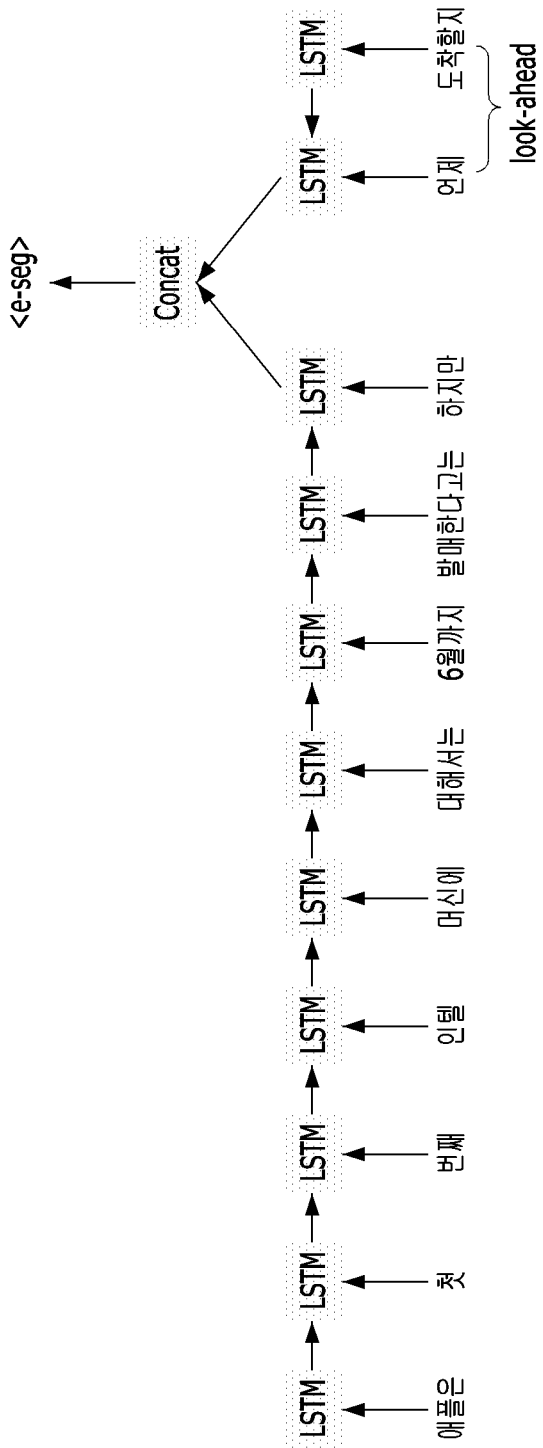
FIGS. 12A and 12B are diagrams for describing a process of classifying a translation unit beginning point, a translation unit segmentation point, a sentence segmentation point, and the other case using a LSTM-RNN.
Figure 12B:
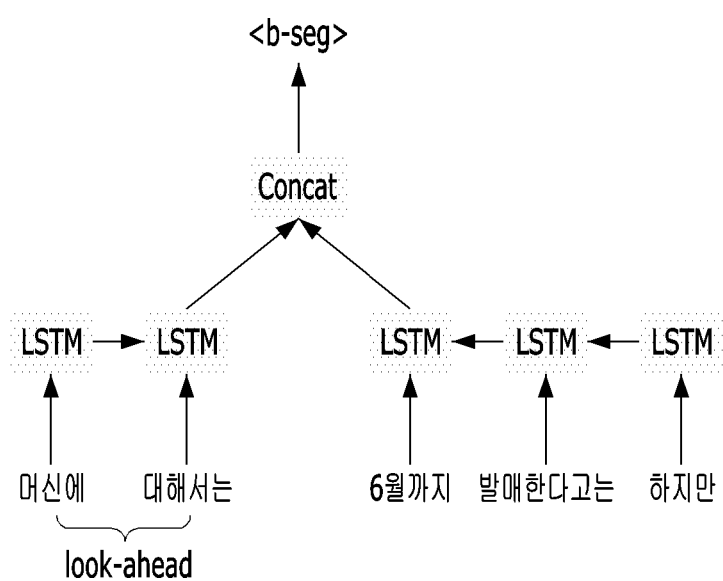

FIGS. 11A and 11B are diagrams for describing the functions of the translation unit 340 according to another embodiment of the present invention. FIGS. 12A and 12B are diagrams for describing a process of classifying a translation unit beginning point <b-seg>, a translation unit ending point <e-seg>, a sentence segmentation point <eos>, and the other case <0> using a LSTM-RNN.

Referring to FIGS. 11A and 11B, the translation unit 340 according to the embodiment of the present invention includes the translation unit recognizing unit 341, the guide translation unit 342, the translation extracting unit 343, and the buffer initialization unit 344, and the translation unit recognizing unit 341 may include a translation unit ending point recognizing unit 3411 and a translation unit beginning point recognizing unit 3412.

The translation unit ending point recognizing unit 3411 sequentially reads words from a buffer, in which the sentence-unit text corresponding to the user's utterance is stored, and recognizes a translation unit ending point <e-seg> and a sentence segmentation point (<eos>) for the read sentence-unit text using the learning model M1 for translation unit learning.

In this case, the translation unit ending point recognizing unit 3411 may recognize the translation unit ending point <e-seg> and the sentence segmentation point <eos> for the current position, on the basis of word information of words input up to the current point of time and information about n look-ahead words.

As such, after recognizing the translation unit ending point <e-seg> and the sentence segmentation point <eos>, a translation unit beginning point <b-seg> for the read sentence-unit text may be additionally recognized through the translation unit beginning point recognizing unit 3412, different from the example of FIG. 7.

For example, the source language corpus of Table 4 for translation unit recognition learning may be provided in the form as below.

Source lang 애플은/0 첫/b-seg 번째/0 인텔/0 머신에/0
0 대해서는/0  6월까지는/b-seg  발매한다고는/0  하지만 /
e-seg  언제/b-seg  도착할지/0  정확한/0 날짜를/
e-seg 확정하지는/0 않았다 /eos When the number of look-ahead words is 2, the translation unit ending point recognizing unit 3411 may classify the text into a translation unit ending point <e-seg>, a sentence segmentation point <eos>, and the other case <0> using a bi-directional LSTM-RNN as shown in FIG. 12A.

That is, the translation unit ending point recognizing unit 3411 may sequentially read the words of the sentence-unit text stored in the buffer using the LSTM-RNN, and classify a case in which the position of a corresponding word is a translation unit ending point <e-seg> as shown in FIG. 12A.

Thereafter, the translation unit beginning point recognizing unit 3412 may classify a case in which the position of a corresponding word is a translation unit beginning point <b-seg> while moving forward with respect to the position that is recognized as the translation unit ending point <e-seg> using the bi-directional LSTM-RNN as shown in FIG. 12B.

An example of a process of recognizing a translation unit ending point <e-seg> and a translation unit beginning point <b-seg> is as follows (hereinafter, "→" and "←" denotes encoding by LSTM-RNN.)

e-seg recognition:
애플은 → 첫 → 번째 → 인텔 → 머신에 → 대해서는 →
6월까지 → 발매한다고는 → 하지만 (40)→ concentration and classification ← 언제 ← 도착할지 (42)
(Look-ahead word): 언제 도착할지 (42)
b-seg recognition:
머신에 → 대해서는 (50)→ concatenation and classification
←6월까지 ← 발매한다고는 ← 하지만 (52)
(Look-ahead words): 머신에 대해서는 (50)

When the translation unit beginning point <b-seg>, the translation unit ending point <e-seg>, and the sentence range ending point <eos> are recognized, a part from the translation unit beginning point <b-seg> to the translation unit ending point <b-seg> is recognized as one translation unit, and the guide translation unit 342 stores the recognized translation unit in a buffer in an cumulative manner for translation.

Thereafter, the guide translation unit 342 stores a remaining sentence $R_{i-1}$ divided from the sentence range text of the user's utterance on the basis of a translation unit ending point <e-seg> in the buffer, and performs translation $T_{i-1}$ on a translation unit $S_{seg}$, which is recognized on the basis of a translation unit ending point <e-seg> and a translation beginning point <b-seg>, in the remaining sentence $R_{i-1}$. When the translation is completed, the translation unit $S_{seg}$ is subject to removal $R_{i-1}-S_{seg}$ from the remaining sentence $R_{i-1}$.

Thereafter, the guide translation unit 342 concatenates, to the remaining sentence $R_{i-1}-S_{seg}$ in which the previous translation unit is removed, a remaining sentence divided on the basis of a next translation unit ending point <e-seg> as $R_i$, which is stored in the buffer.

Thereafter, the guide translation unit 342 adds a translation unit $S_{seg}$ recognized on the basis of a translation unit ending point <e-seg> and a translation unit beginning point <b-seg> in the concatenated remaining sentence $R_i$ to the previously recognized translation unit $S_i=S_{i-1}+S_{seg}$.

Thereafter, the guide translation unit 342 performs translation-unit based translation Ti on the translation unit accumulation result $S_i=S_{i-1}+S_{seg}$ recognized up to the current point of time, on the basis of the translation unit accumulation result $S_i=S_{i-1}+S_{seg}$ recognized up to the current point of time and the translation result $T_{i-1}$ translated up to the previous point of time in the sentence, and removes the translation unit accumulation result recognized up to the current point of time from the concatenated remaining sentence.

Thereafter, when the translation unit-based translation is completed, the translation extracting unit 343 removes the translation result $T_{i-1}$ translated up to the previous point of time in the sentence as $T_i$-$T_{i-1}$ so as to generate and output a translation result for the currently recognized translation unit $T_{seg}$.

In a case that the position of the current word corresponds to a sentence segmentation point <eos>, the buffer initialization unit 344, in response to the presence of a remaining sentence $R_i$ in the remaining sentence buffer, performs guide translation using the remaining sentence as a translation unit $S_{seg}$, and in response to the absence of a remaining sentence in the remaining sentence buffer, initializes the sentence range text and the translation unit-based translation result that are stored in the buffer.

With the respective function blocks described above, the entire translation process for the above-described example is as the following Table 6.

For reference, the elements according to the embodiments of the present invention shown in FIGS. 1 to 12 may each be implemented in the form of software or in the form of hardware such as a field programmable gate array (FPGA) or an application specific integrated circuit (ASIC) and may perform predetermined functions. However, the 'elements' are not meant to be limited to software or hardware. In other embodiments, each of the elements may be stored in an addressable storage medium, or may execute one or more processors.

Therefore, for example, the elements may include elements such as software elements, object-oriented software elements, class elements, and task elements, processes, functions, attributes, procedures, subroutines, segments of program code, drivers, firmware, microcode, circuits, data, databases, data structures, tables, arrays, and variables.

TABLE 6

$S_0$: " "
$T_0$: " "
$R_1$: "애플은 첫 번째 인텔 머신에 대해서는 6월까지는 발매한다고는 하지만 "
$S_{seg}$: "6월까지 발매한다고는      하지만 "
$R_1$: "애플은 첫 번째 인텔 머신에 대해서는 "
$S_1$: "6월까지 발매한다고는 하지만 "
$T_1$: "saying only that they should be on the market by june"
$T_{seg}$: "saying only that they should be on the market by june"
$R_2$: "애플은 첫 번째 인텔 머신에 대해서는 언제 도착할지 정확한 날짜를 "
$S_{seg}$: "'첫 번째 인텔 머신에 대해서는 언제 도착할지 정확한 날짜를 "
$R_2$: " 애플은"
$S_2$: " 6월까지 발매한다고는 하지만 첫 번째 인텔 머신에 대해서는
        언제 도착할지 정확한
        날짜를"
$T_2$: "saying only that they should be on the market by june an exact date when the first intel machines will arrive"
$T_{seg}$: "an exact date when the first intel machines will arrive "
$R_2$: " 애플은 확정하지는 않았다. "
$S_{seg}$: "애플은 확정하지는 않았다."
$R_2$: " " "
$S_3$: "'6월까지 발매한다고는 하지만 첫 번째 인텔 머신에 대해서는 언제 도착할지 정확한
        날짜를 애플은 확정하지는 않았다."
$T_3$: "saying only that they should be on the market by june an exact date when the first intel machines will arrive apple has not pinned"
$T_{seg}$: "apple has not pinned"
$S_0$: " "
$T_0$: " "

Elements and functions provided in corresponding elements may be combined into fewer elements or may be further divided into additional elements.

Hereinafter, a simultaneous interpretation method of the simultaneous interpretation system 1 using the translation unit bilingual corpus according to the present invention will be described with reference to FIG. 13.

Figure 13:
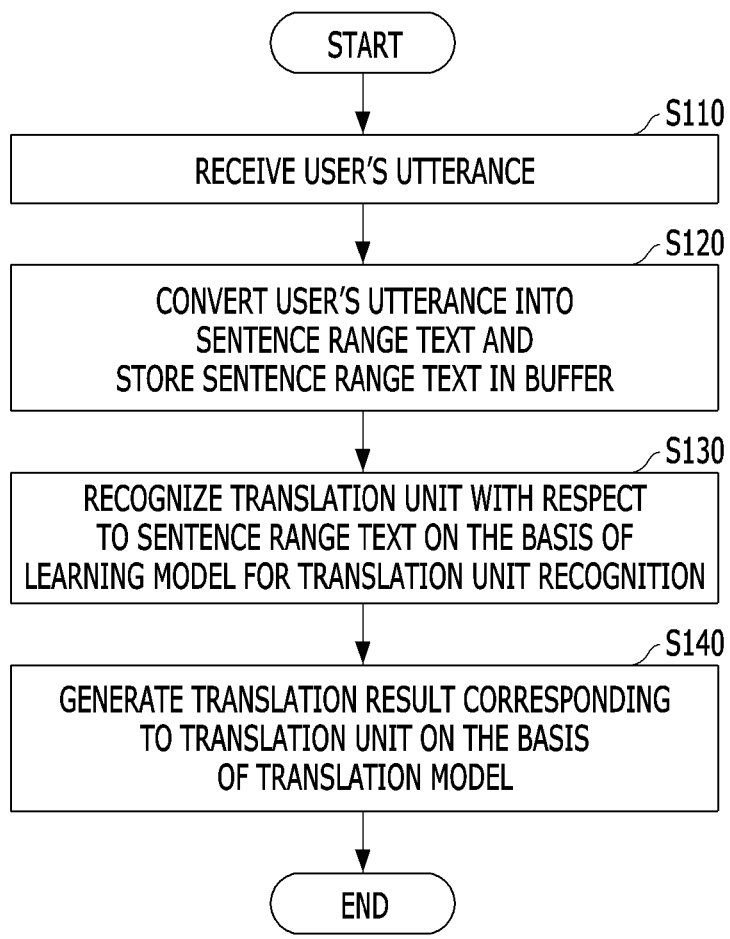
FIG. 13 is a flowchart showing a simultaneous interpretation method according to an embodiment of the present invention.

FIG. 13 is a flowchart showing a simultaneous interpretation method according to an embodiment of the present invention.

The simultaneous interpretation method according to the embodiment of the present invention may include receiving an utterance of a user (S110) first and converting the received user's utterance into text and storing the text in a buffer (S120).

Thereafter, translation unit recognition is performed with respect to the text on the basis of the learning model M1 for recognizing a translation unit (S130), and in response to the completion of the translation unit recognition, a translation result corresponding to the translation unit is generated on the basis of the translation model M2 for performing translation (S140).

In the performing of the translation unit recognition, a translation unit segmentation point, a sentence segmentation point, and a translation unit beginning point for the sentence range text stored in the buffer are recognized on the basis of translation unit segmentation information and sentence segmentation information, a translation unit is recognized by the translation unit segmentation point, the sentence segmentation point, and the translation unit beginning point, and the recognized translation unit is stored in the buffer.

Meanwhile, in order to learn the learning model M1 for translation unit recognition and the translation model M2 for translation performance, the simultaneous interpretation method according to the embodiment of the present invention may generate a translation unit bilingual corpus C2 including at least one of translation unit segmentation information and sentence segmentation information.

In this case, the translation unit bilingual corpus C2 may be generated by performing word alignment on words corresponding to each other between the source language and the target language with respect to the sentence separated bilingual corpus C1, recognizing a translation unit on the basis of syntax information of at least one of the source language and the target language subjected to the word alignment, and adjusting the word order of at least one of the source language and the target language with respect to the word aligned result on the basis of the recognized translation unit.

On the other hand, operations S110 to S140 described above may be further divided into additional operations or may be combined into fewer operations according to embodiments. In addition, some operations may be omitted if required, and the order thereof may be switched. In addition, content described in FIGS. 1 to 12 that is omitted in FIG. 13 may be applied to the simultaneous translation method described with reference to FIG. 13.

The embodiments of the present invention may be implemented in the form of a computer program stored in a medium executed by a computer or a recording medium including instructions executable by a computer. Computer-readable media may be any available media that may be accessed by a computer and include both volatile and nonvolatile media and both removable and non-removable media. The computer-readable medium may also include both computer storage media and communication media. The computer storage media includes volatile, nonvolatile, removable, and non-removable media implemented in any method or technology for storing information such as computer readable instructions, data structures, program modules or other data. The communication media typically includes computer readable instructions, data structures, program modules, or other data in a modulated data signal, such as a carrier wave, or another transmission mechanism, and any information delivery media.

Although the method and system according to the present invention have been described in relation to the specific embodiments, some or all of those elements or operations may be implemented using a computer system having a general-purpose hardware architecture.

As is apparent from the above, a translation unit bilingual corpus is generated from the existing sentence separated bilingual corpus and a learning model and a translation model are learned and applied, so that with respect to continuous utterances of a user, natural simultaneous interpretation results can be provided without having a great time delay.

The exemplary embodiments of the present invention are illustrative in nature, and those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. For example, each element described as a single entity may be implemented in a distributed form, and elements described as being distributed may be implemented in a combined form.

The scope of the invention is set forth in the following claims rather than the above specification, and it is intended that the present invention covers all modifications provided they come within the scope of the appended claims and their equivalents.

What is claimed is:

1. A simultaneous interpretation system using a translation unit bilingual corpus, the simultaneous interpretation system comprising:
   a microphone configured to receive an utterance of a user;
   a memory in which a program for recognizing the utterance of the user and generating a translation result is stored; and
   a processor configured to execute the program stored in the memory,
   wherein the processor executes the program so as to convert the received utterance of the user into text, store the text in a speech recognition buffer, perform recognition of translation unit with respect to the text on the basis of a learning model for translation unit recognition, and in response to the translation unit recognition being completed, generate a translation result corresponding to the translation unit on the basis of a translation model for translation performance,
   wherein the processor generates the translation unit bilingual corpus from a sentence separated bilingual corpus, the translation unit bilingual corpus including at least one of (i) sub-sentence translation unit segmentation information for distinguishing each sub-sentence translation unit and (ii) sentence segmentation information for distinguishing each sentence translation unit, and the processor learns the learning model and the translation model on the basis of the generated translation unit bilingual corpus,
   wherein the processor performs word alignment on words corresponding to each other between a source language and a target language with respect to the sentence separated bilingual corpus, recognizes a translation unit on the basis of syntax information of at least one of the source language and the target language subjected to the word alignment, and adjusts a word order of the target language on the basis of the recognized translation unit with respect to the word aligned result so as to generate the translation unit bilingual corpus.

2. The simultaneous interpretation system of claim 1, further comprising an output unit including at least one of a loudspeaker configured to output the translation result as a speech and a display configured to output the translation result on a screen.

3. The simultaneous interpretation system of claim 1, wherein the source language is Korean and the target language is English.

4. The simultaneous interpretation system of claim 3, wherein, when a partial dependency tree of a verb or a noun in a result of dependency structure parsing of the source language has a word length longer than or equal to a predetermined word length, the processor recognizes the partial dependency tree as the translation unit.

5. The simultaneous interpretation system of claim 4, wherein, when a nearby translation unit generated by the recognized translation unit has a word length shorter than the predetermined word length, the processor excludes a currently recognized translation unit candidate and recognizes a partial dependency tree arranged later as a translation unit representing a candidate for translation.

6. The simultaneous interpretation system of claim 3, wherein the processor performs a post-processing process of generating an ending corresponding to the target language whose word order is adjusted so as to generate the translation unit bilingual corpus.

7. The simultaneous interpretation system of claim 3, wherein the processor recognizes a sub-sentence translation unit segmentation point and a sentence segmentation point with respect to a word stream entering the speech recognition buffer on the basis of the sub-sentence translation unit segmentation information and the sentence segmentation information, and adds a translation unit divided by the sub-sentence translation unit segmentation point and the sentence segmentation point to a translation unit buffer.

8. The simultaneous interpretation system of claim 7, wherein the processor recognizes the sub-sentence translation unit segmentation point and the sentence segmentation point for a current position on the basis of word information of words input into the speech recognition buffer up to a current point of time and information about n look-ahead words.

9. A simultaneous interpretation system using a translation unit bilingual corpus, the simultaneous interpretation system comprising:
   a microphone configured to receive an utterance of a user;
   a memory in which a program for recognizing the utterance of the user and generating a translation result is stored; and
   a processor configured to execute the program stored in the memory,
   wherein the processor executes the program so as to convert the received utterance of the user into text, store the text in a speech recognition buffer, perform recognition of translation unit with respect to the text on the basis of a learning model for translation unit recognition, and in response to the translation unit recognition being completed, generate a translation result corresponding to the translation unit on the basis of a translation model for translation performance,
   wherein the processor generates the translation unit bilingual corpus from a sentence separated bilingual corpus, the translation unit bilingual corpus including at least one of (i) sub-sentence translation unit segmentation information for distinguishing each sub-sentence translation unit and (ii) sentence segmentation information for distinguishing each sentence translation unit, and the processor learns the learning model and the translation model on the basis of the generated translation unit bilingual corpus, wherein the processor performs word alignment on words corresponding to each other between a source language and a target language with respect to the sentence separated bilingual corpus, recognizes a translation unit on the basis of syntax information of at least one of the source language and the target language subjected to the word alignment, and simultaneously adjusts a word order of the source language and a word order of the target language on the basis of the recognized translation unit with respect to the word aligned result so as to generate the translation unit bilingual corpus.

10. The simultaneous interpretation system of claim 9, wherein, when a partial dependency tree including a verb- or noun-dependent word in a result of dependency structure parsing of the target language has a word or syntactic word length longer than or equal to a predetermined word length, the processor recognizes the partial dependency tree as the translation unit.

11. The simultaneous interpretation system of claim 10, wherein the processor recognizes a sub-sentence translation unit segmentation point including a translation unit beginning point and a translation unit ending point and a sentence segmentation point with respect to a remaining sentence buffer that stores an incoming word stream as a result of the speech recognition, wherein the processor is configured to:
recognize the translation unit ending point and the sentence segmentation point for a current position on the basis of word information of words input into the remaining sentence buffer up to a current point of time and information about n look-ahead words, and
while using the sub-sentence translation unit segmentation point as an ending point,
recognize the translation unit beginning point on the basis of word information of words before the ending point and information about n look-ahead words.

12. The simultaneous interpretation system of claim 11, wherein the processor adds a translation unit that is recognized in the remaining sentence on the basis of the translation unit ending point and the translation unit beginning point to a translation unit accumulation result recognized up to a previous point of time so as to generate a translation unit accumulation result recognized up to a current point of time and remove the translation unit from the remaining sentence.

13. The simultaneous interpretation system of claim 12, wherein the processor performs translation on the translation unit accumulation result recognized up to the current point of time and removes a translation result of the translation unit accumulation result recognized up to the previous point of time from the translation on the translation unit accumulation result recognized up to the current point of time so as to generate a translation result of the currently recognized translation unit.

14. A simultaneous interpretation method using a translation unit bilingual corpus, the simultaneous interpretation method comprising:
receiving an utterance of a user;
converting the received utterance of the user into text and storing the text in a speech recognition buffer;
performing recognition of translation unit with respect to the text on the basis of a learning model for translation unit recognition;
in response to the translation unit recognition being completed, generating a translation result corresponding to the translation unit on the basis of a translation model for translation performance;
generating the translation unit bilingual corpus from a sentence separated bilingual corpus, the translation unit bilingual corpus including at least one of (i) sub-sentence translation unit segmentation information for distinguishing each sub-sentence translation unit and (ii) sentence segmentation information for distinguishing each sentence translation unit; and
learning the learning model and the translation model on the basis of the generated translation unit bilingual corpus,
wherein the generating of the translation unit bilingual corpus includes:
performing word alignment on words corresponding to each other between a source language and a target language with respect to the sentence separated bilingual corpus;
recognizing a translation unit on the basis of syntax information of at least one of the source language and the target language subjected to the word alignment; and
adjusting at least one of a word order of the source language and a word order of the target language on the basis of the recognized translation unit with respect to the word aligned result so as to generate the translation unit bilingual corpus.

15. The simultaneous interpretation method of claim 14, wherein the performing of the translation unit recognition with respect to the speech recognition text on the basis of the learning model for translation unit recognition includes:
recognizing a sub-sentence translation unit segmentation point, a sentence segmentation point, and a translation unit beginning point with respect to text stored in the speech recognition buffer on the basis of the sub-sentence translation unit segmentation information and the sentence segmentation information; and
adding a translation unit divided by the sub-sentence translation unit segmentation point, the sentence segmentation point, and the translation unit beginning point to a translation unit buffer.

* * * * *